US010612655B2

(12) United States Patent
Semet et al.

(10) Patent No.: US 10,612,655 B2
(45) Date of Patent: Apr. 7, 2020

(54) APPARATUS FOR AXIALLY ADJUSTING A SWITCHING ELEMENT

(71) Applicant: Bayerische Motoren Werke Aktiengesellschaft, Munich (DE)

(72) Inventors: Wolfgang Semet, Pfaffenhofen (DE); Achim Gordner, Grossberghofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 188 days.

(21) Appl. No.: 15/889,517

(22) Filed: Feb. 6, 2018

(65) Prior Publication Data
US 2018/0163865 A1 Jun. 14, 2018

Related U.S. Application Data

(63) Continuation of application No. PCT/EP2016/067187, filed on Jul. 19, 2016.

(30) Foreign Application Priority Data

Oct. 2, 2015 (DE) .................. 10 2015 219 106

(51) Int. Cl.
*F16H 63/18* (2006.01)
*F16H 25/18* (2006.01)
(Continued)

(52) U.S. Cl.
CPC ............ *F16H 63/18* (2013.01); *F16H 25/186* (2013.01); *F16H 53/02* (2013.01); *F16H 63/24* (2013.01);
(Continued)

(58) Field of Classification Search
CPC ........ F16H 63/18; F16H 25/186; F16H 53/02; F16H 63/24; F16H 63/304; F16H 63/3069
See application file for complete search history.

(56) References Cited

U.S. PATENT DOCUMENTS 8,919,515 B2 * 12/2014 Granzow .............. F16H 63/304
192/69.9
9,599,219 B2 * 3/2017 Volpert ................... F16H 63/04
(Continued)

FOREIGN PATENT DOCUMENTS

CN 102667260 A 9/2012
CN 104736901 A 6/2015
(Continued)

OTHER PUBLICATIONS

International Search Report (PCT/ISA/210) issued in PCT Application No. PCT/EP2016/067187 dated Sep. 2, 2016 with English translation (seven pages).
(Continued)

*Primary Examiner* — Zakaria Elahmadi
(74) *Attorney, Agent, or Firm* — Crowell & Moring LLP

(57) ABSTRACT

An apparatus for axially adjusting a shifting element includes a shifting shaft, which can be rotated about an axis, an actuating body, which is connected to the shifting shaft for conjoint rotation and in an axially movable manner and which has at least two slotted guide sections designed as grooves on a peripheral surface, and a linear actuator, which is associated with the actuating body and has an actuatable actuator pin, which can engage in the slotted guide sections in order to axially move the actuating body. Each slotted guide section has an incoupling region for the actuator pin, an opposite outcoupling region for the actuator pin, and an adjusting region, which lies therebetween in the peripheral direction and is bent in a curved shape, for axially moving the actuating body. The incoupling region and the outcoupling region of the slotted guide sections that are adjacent in the peripheral direction are arranged at the same axial position.

18 Claims, 2 Drawing Sheets

(51) Int. Cl.
*F16H 63/30* (2006.01)
*F16H 53/02* (2006.01)
*F16H 63/24* (2006.01)
*F01L 13/00* (2006.01)

(52) U.S. Cl.
CPC ....... *F16H 63/304* (2013.01); *F16H 63/3069* (2013.01); *F01L 2013/0052* (2013.01); *F16H 2063/305* (2013.01); *F16H 2063/3056* (2013.01); *F16H 2063/3073* (2013.01); *F16H 2063/3093* (2013.01)

(56) References Cited

U.S. PATENT DOCUMENTS

| | | | |
|---|---|---|---|
| 10,107,396 B2* | 10/2018 | Hofkirchner | F16H 63/3425 |
| 2001/0006921 A1* | 7/2001 | Reik | B60W 10/02 |
| | | | 477/79 |
| 2010/0005917 A1* | 1/2010 | Garabello | F16H 63/18 |
| | | | 74/473.37 |
| 2011/0100144 A1* | 5/2011 | Neelakantan | F16H 61/688 |
| | | | 74/473.36 |
| 2011/0247577 A1 | 10/2011 | Elendt et al. | |
| 2012/0255382 A1* | 10/2012 | Richter | F16H 63/304 |
| | | | 74/333 |
| 2013/0319142 A1* | 12/2013 | Kim | F16H 61/32 |
| | | | 74/57 |
| 2013/0334001 A1 | 12/2013 | Albrecht et al. | |
| 2014/0116180 A1* | 5/2014 | Keller | F16D 11/10 |
| | | | 74/473.36 |
| 2014/0338484 A1* | 11/2014 | Maki | F16H 61/68 |
| | | | 74/337.5 |
| 2015/0240942 A1 | 8/2015 | Schumann et al. | |
| 2015/0285375 A1 | 10/2015 | Volpert | |
| 2015/0300488 A1 | 10/2015 | Volpert | |
| 2015/0330506 A1* | 11/2015 | Volpert | F16H 63/18 |
| | | | 74/473.36 |

FOREIGN PATENT DOCUMENTS

| | | |
|---|---|---|
| CN | 104838179 A | 8/2015 |
| DE | 10 2005 003 079 A1 | 8/2006 |
| DE | 10 2007 056 692 A1 | 5/2009 |
| DE | 10 2008 036 462 A1 | 2/2010 |
| DE | 10 2009 009 080 A1 | 8/2010 |
| DE | 10 2009 054 942 A1 | 6/2011 |
| DE | 10 2010 048 739 A1 | 4/2012 |
| DE | 10 2011 004 912 A1 | 9/2012 |
| DE | 10 2012 210 298 A1 | 12/2013 |
| DE | 10 2012 020 426 A1 | 4/2014 |
| DE | 10 2012 221 069 A1 | 5/2014 |
| DE | 10 2013 204 655 A1 | 9/2014 |
| WO | WO 2010/015328 A1 | 2/2010 |

OTHER PUBLICATIONS

German-language Written Opinion (PCT/ISA/237) issued in PCT Application No. PCT/EP2016/067187 dated Sep. 2, 2016 (seven pages).

German-language Search Report issued in counterpart German Application No. 10 2015 219 106.0 dated Jul. 25, 2016 with partial English translation (13 pages).

English Translation of Chinese-language Office Action issued in counterpart Chinese Application No. 201680035445.0 dated Nov. 21, 2018 (nine (9) pages).

\* cited by examiner

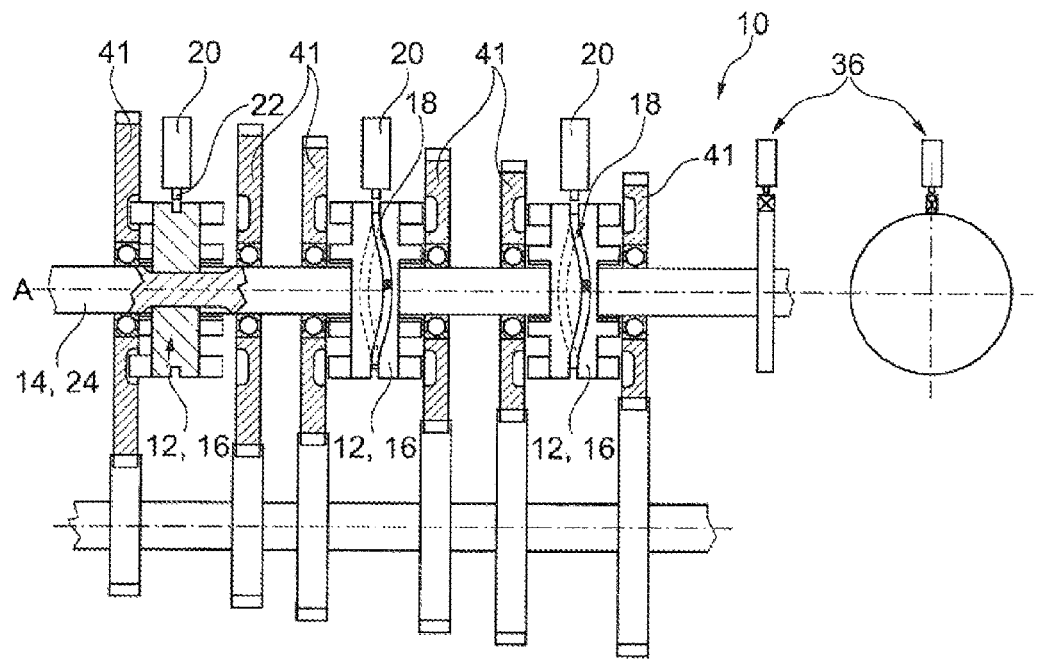
Fig. 3
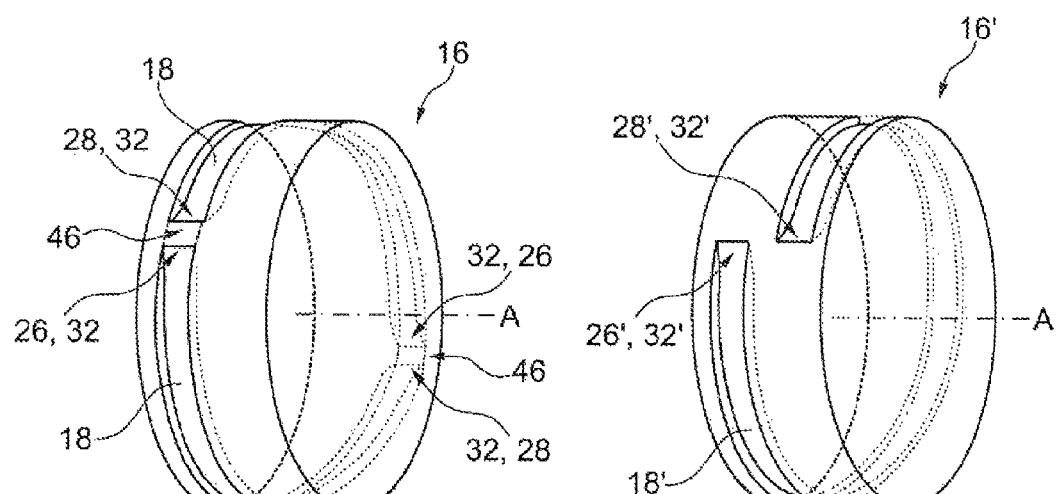
Fig. 4
Fig. 5
(Prior art)

APPARATUS FOR AXIALLY ADJUSTING A SWITCHING ELEMENT

CROSS REFERENCE TO RELATED APPLICATIONS

This application is a continuation of PCT International Application No. PCT/EP2016/067187, filed Jul. 19, 2016, which claims priority under 35 U.S.C. § 119 from German Patent Application No. 10 2015 219 106.0, filed Oct. 2, 2015, the entire disclosures of which are herein expressly incorporated by reference.

BACKGROUND AND SUMMARY OF THE INVENTION

The invention relates to an apparatus for axially adjusting a shifting element, it being possible for the shifting element to be, for example, the slider sleeve of a manual transmission for vehicles or the cam carrier of a valve train for an internal combustion engine.

DE 10 2005 003 079 A1 discloses a valve train for an internal combustion engine, having a camshaft, on which a cam carrier and two worm drives for axially adjusting the cam carrier are provided. Each worm drive is assigned an actuator with an actuating pin, the actuating pin being arranged such that it can be displaced radially in relation to the camshaft. It is possible for said actuating pin to be brought selectively into engagement or out of engagement with the associated worm drive. Here, the one worm drive with its associated actuator brings about an axial movement of the cam carrier from a first shifting position into a second shifting position, whereas the other worm drive with its associated actuator makes an opposite axial movement back into the first shifting position possible.

It is an object of the invention to provide a particularly compact apparatus for axially adjusting a shifting element, which apparatus ensures a desired axial adjustment by way of low structural complexity.

This and other objects are achieved according to the invention by way of an apparatus for axially adjusting a shifting element, having a shift shaft which can be rotated about an axis, an actuating body which is connected to the shift shaft fixedly so as to rotate with it and in an axially displaceable manner, and, on a circumferential face, has at least two slotted guide sections which are configured as a groove, and a linear actuator which is assigned to the actuating body and has an actuable actuator pin which can engage into the slotted guide sections for axially displacing the actuating body. Each slotted guide section has an engaging region for the actuator pin, an opposite disengaging region for the actuator pin, and an actuating region which lies in between in the circumferential direction and is bent in a curved manner for axially displacing the actuating body. The disengaging region and the engaging region of slotted guide sections which are adjacent in the circumferential direction are arranged at the same axial position. In this way, the shifting element can be adjusted axially in opposite directions by way of only a single linear actuator. The result is that a desired shifting position of the shifting element can be realized with low complexity.

In accordance with one embodiment, slotted guide sections which are adjacent in the circumferential direction merge into one another and form a slotted guide which runs continuously in the circumferential direction. In other words, this means that the slotted guide which is configured as a groove and runs in the circumferential direction does not have any discontinuity points, that is to say it does not have any "gaps" in the axial direction.

As an alternative, slotted guide sections which are adjacent in the circumferential direction can be spaced apart from one another, with the result that there are groove-free sections in the circumferential direction between said slotted guide sections which are configured as a groove. The groove-free sections make relatively simple engaging and disengaging of the actuator pin into the slotted guide sections possible.

The engaging regions and/or the disengaging regions of the slotted guide sections are preferably configured at least in sections as ramps for reducing a radial groove depth. The ramps likewise contribute to relatively simple engaging and disengaging of the actuator pin into the slotted guide sections which are configured as a groove. Furthermore, in the case of a suitable sensor system in the linear actuator, the passage through an engaging region and/or a disengaging region can also be determined via the radial position of the actuator pin, which radial position is changed by way of the ramps.

The engaging region and the opposite disengaging region of an (in particular, every) slotted guide section are particularly preferably spaced apart axially from one another. As a result, the actuating body is displaced axially in a desired way by way of the axially fixed linear actuator between the engagement and the disengagement into the slotted guide sections which are configured as a groove.

In accordance with one embodiment of the apparatus for axially adjusting a shifting element, the actuating body has precisely two slotted guide sections which preferably extend over in each case approximately 180°.

As an alternative, the actuating body can have precisely four slotted guide sections, each of the slotted guide sections preferably extending over approximately 90° in this case.

In general, the actuating body can have an even number of slotted guide sections, each slotted guide section preferably extending over approximately 360°/number of slotted guide sections in this case.

Otherwise, a rotational angle sensor for determining the rotational position of the actuating body is preferably provided. The detection of the rotational position of the actuating body is advantageous, in particular, when the actuating body has more than two slotted guide sections, and at least two engaging and disengaging regions of the actuating body are arranged at the same axial position.

In the case of the apparatus for axially adjusting a shifting element, the shift shaft can be, for example, a camshaft and the shifting element can be a cam carrier.

In accordance with one preferred, alternative embodiment of the apparatus, the shifting element is a slider sleeve of a manual transmission for vehicles.

Accordingly, the invention also includes a manual transmission for vehicles, having a drive shaft and the above-described apparatus for adjusting a shifting element, the drive shaft being connected in gear terms to the shift shaft or being identical to it.

In accordance with one design variant of the manual transmission, the drive shaft and the shift shaft are coupled by way of a gear mechanism with a fixed transmission ratio. Here, the rotation of the drive shaft is preferably stepped down by way of the transmission. Therefore, relatively long response and shifting times of the linear actuator can also be accepted, and the costs for the linear actuator can therefore be reduced.

Here, the actuating body and the shifting element can be coupled in the axial direction by use of a spring element. The axial elastic coupling provides an overload safeguard and prevents the manual transmission from being damaged by way of an axial adjusting movement of the actuating body in the case of an axially blocked shifting element.

In accordance with an alternative design variant of the manual transmission, the gear mechanism drive shaft corresponds to the shift shaft, and the actuating body is identical to the shifting element. As a consequence, the slider sleeve corresponds to the shifting element and, moreover, also has the slotted guide sections. The number of individual components can advantageously be reduced as a result. However, a relatively great amount of axial installation space is required in the region of the slider sleeve, in order to form the slotted guide sections and to arrange the linear actuator in an adjacent manner with respect thereto.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a diagrammatic sectional view of an apparatus according to the invention for axially adjusting a shifting element in accordance with an alternative embodiment.

FIG. 4 is a perspective illustration of an actuating body for an apparatus according to the invention for axially adjusting a shifting element.

FIG. 5 is a perspective illustration of an actuating body for an apparatus for axially adjusting a shifting element according to the prior art.

DETAILED DESCRIPTION OF THE DRAWINGS

Figure 1:
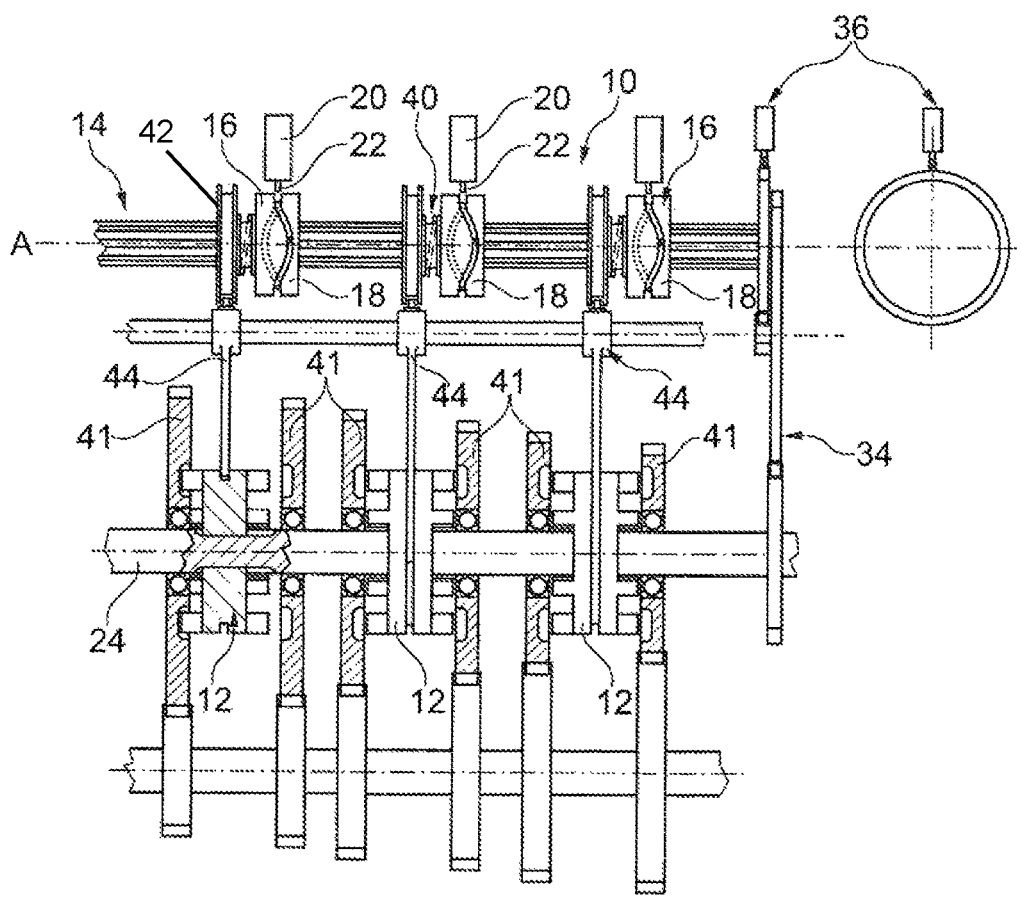
FIG. 1 is a diagrammatic sectional view of an apparatus according to the invention for axially adjusting a shifting element in accordance with one embodiment.
Figure 2:
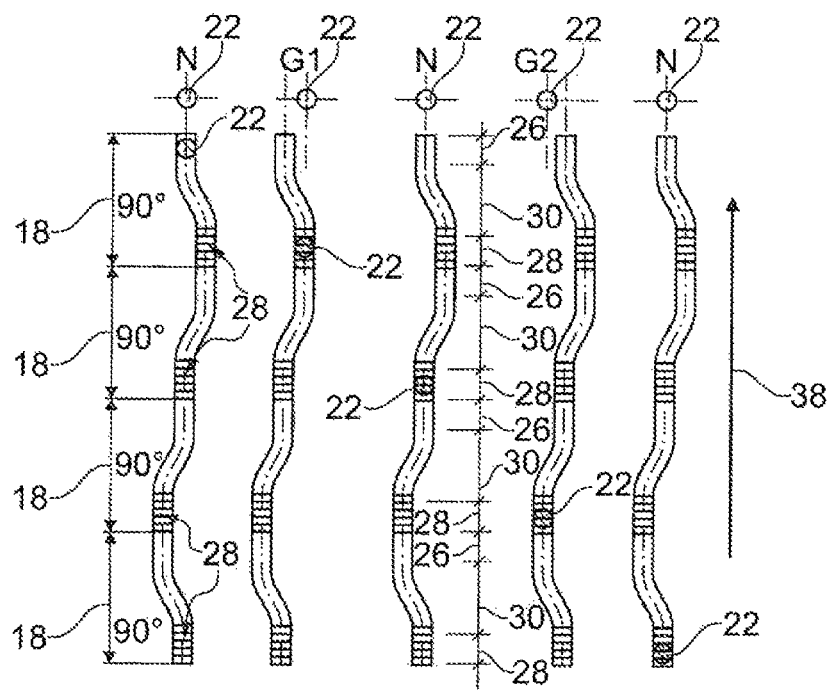
FIG. 2 is a developed view of the slotted guide sections of an actuating body of the apparatus according to FIG. 1, in different shifting positions.

FIGS. 1 to 3, in each case, show an apparatus 10 for axially adjusting a shifting element 12 having a shift shaft 14 which can be rotated about an axis A. An actuating body 16 is connected to the shift shaft 14 fixedly so as to rotate with it and in an axially displaceable manner, and has at least two slotted guide sections 18 which are configured as a groove on a radial outer circumferential face. Furthermore, a linear actuator 20 is provided which is assigned to the actuating body 16 and has an actuable actuator pin 22 which can engage into the slotted guide sections 18 for axially displacing the actuating body 16.

In the exemplary embodiments which are shown, the apparatus 10 for axially adjusting the shifting element 12 is a manual transmission for vehicles, the manual transmission having a drive shaft 24 which is connected in gear terms to the shift shaft 14 or is identical to it, and the shifting element 12 being a slider sleeve of the manual transmission.

As an alternative, the apparatus 10 for axially adjusting the shifting element 12 could be, for example, a valve train for internal combustion engines, the shift shaft 14 being a camshaft and the shifting element 12 being a cam carrier.

According to FIG. 1, the apparatus 10 which is configured as a manual transmission has three actuating bodies 16 which are configured as slider sleeves with, in each case, one associated linear actuator 20. It goes without saying, however, that the apparatus 10 can also have more or fewer actuating bodies 16.

In the present case, the manual transmission is a six-gear transmission, in which each actuating body 16 can move its associated slider sleeve into three different axial positions, namely two shifting positions G1, G2 which are opposed axially and a neutral position N which lies centrally in between (cf. FIG. 2).

FIG. 2 shows a developed view of the slotted guide sections 18 of one of the actuating bodies 16 according to FIG. 1. The actuating body in the exemplary embodiment which is shown has precisely four slotted guide sections 18 which extend in each case over 90°.

According to FIG. 2, each slotted guide section 18 includes an engaging region 26 for the actuator pin 22, a disengaging region 28 for the actuator pin 22, which disengaging region 28 is opposite in the groove longitudinal direction, and an actuating region 30 for axially displacing the actuating body 16, which actuating region 30 lies in between in the circumferential direction and is bent in a curved shape. The engaging region 26 and the disengaging region 28 of slotted guide sections 18 which are adjacent in the circumferential direction are arranged at the same axial position. At the same axial position means that those ends of adjacent slotted guide sections 18 which adjoin one another in the circumferential direction are not arranged axially in an offset manner. Without an axial offset, the adjacent slotted guide sections 18 then either merge directly into one another in the circumferential direction (see FIGS. 1-3) or are separated from one another by way of a groove-free section (see FIG. 4). In this way, starting from a neutral position N, the shifting element 12 which is configured as a slider sleeve can be moved axially into at least one shifting position G1, G2 and back again into the neutral position by way of only a single linear actuator 20. Therefore, considerably fewer linear actuators than in the prior art are required to realize desired shifting functions.

Whereas the actuating region 30 of each slotted guide section 18 for axially displacing the actuating body 16 is bent in a curved shape, the engaging region 26 and the disengaging region 28 of each slotted guide section 18, which disengaging region 28 is opposite said engaging region 26 in the circumferential direction, extend linearly and substantially perpendicularly with respect to the axis A according to FIG. 2, in order to simplify engaging and disengaging of the associated actuator pin 22. As a consequence, the engaging region 26 and the opposite disengaging region 28 of each slotted guide section 18 are spaced apart axially from one another.

According to FIG. 2, slotted guide sections 18 which are adjacent in the circumferential direction merge directly into one another and form a slotted guide which runs continuously in the circumferential direction. In other words, the slotted guide sections 18 which are configured as a groove form a groove overall which runs around continuously on the radial outer side of the actuating body 16 and does not have any "gaps" in the axial direction.

The engaging regions 26 and/or the disengaging regions 28 can be configured at least in sections as ramps 32 for reducing a radial groove depth. In the actuating region 30, a comparatively great radial groove depth ensures reliable guidance of the actuator pin 22 in the slotted guide section 18, whereas a radial groove depth in the engaging and disengaging regions 26, 28 which is reduced by way of ramps facilitates the engaging and disengaging of the actuator pin 22.

FIG. 1 shows one embodiment of the apparatus 10, in which the drive shaft 24 of the manual transmission and the separate shift shaft 14 of the apparatus 10, which shift shaft 14 is configured as a splined shaft, are coupled by way of a transmission gear mechanism 34 with a fixed transmission ratio. The transmission gear mechanism 34 steps down a rotation of the drive shaft 24. Relatively long response and shifting times of the linear actuator 20 can therefore be accepted, and the costs for the linear actuator 20 can therefore be reduced.

Furthermore, the apparatus 10 has a rotational angle sensor 36 for determining the rotational position of the actuating body 16. A rotational angle sensor 36 of this type is advantageous, in particular, when more than two slotted guide sections 18 are provided on the circumferential face of the actuating body 16, as, for example, in the embodiment according to FIGS. 1 and 2.

According to FIG. 2, the slotted guide sections 18 define a neutral position N (illustrations on the outside left and on the outside right) which is adjoined in the rotational direction 38 of the actuating body 16 by a first shifting position G1, and a further neutral position N (central illustration) which is adjoined in the rotational direction 38 of the actuating body 16 by a second shifting position G2.

Starting from an axial neutral position of the actuating body 16, a gear which is assigned to the first shifting position or a gear which is assigned to the second shifting position is engaged in a manner which is dependent on the rotational position of the actuating body 16, at which the actuator pin 22 engages into the slotted guide sections 18. If a shifting operation is then to be carried out into a defined gear, the linear actuator 20 can be actuated by way of the rotational angle sensor 36 in such a way that the actuator pin 22 engages into the corresponding slotted guide section 18 in the case of a suitable rotational position of the actuating body 16.

With regard to the sensor accuracy, it is completely sufficient if the two engaging regions 26 of the slotted guide sections 18, which engaging regions 26 are arranged at the same axial position, can be identified reliably by way of the rotational angle sensor 36. According to FIG. 2, said two engaging regions 26 are spaced apart by approximately 180° in the circumferential direction, and lie substantially opposite one another.

According to FIG. 1, the actuating body 16 and the shifting element 12 are coupled in the axial direction via a spring element 40. In concrete terms, an actuating gear 42 is loaded via the spring element 40 in the case of an axial displacement of the actuating body 16. The actuating gear 42 is connected in the axial direction to the slider sleeve in a positively locking manner via a selector fork 44. The slider sleeve can therefore be displaced into its axial neutral position (central and right-hand slider sleeve in FIG. 1) or into one of its axial shifting positions G1, G2 (left-hand slider sleeve in FIG. 1) by way of the actuating body 16, the neutral position corresponding to idling. In the shifting position G1, G2, the drive shaft 24 is connected substantially fixedly to a gear wheel 41 so as to rotate with it via the slider sleeve, and an associated gear of the manual transmission is engaged. The axially elastic coupling by way of the spring element 40 provides an overload safeguard and prevents the manual transmission from being damaged as a result of an axial adjusting movement of the actuating body 16 in the case of an axially blocked slider sleeve.

FIG. 3 shows a further embodiment of the apparatus 10, the general construction principle and the method of operation corresponding substantially to the embodiment according to FIG. 1, with the result that reference is made in this regard to the above description and only the differences will be described in the following text.

The apparatus 10 according to FIG. 3 differs from the embodiment according to FIG. 1 substantially in that the drive shaft 24 of the manual transmission corresponds to the shift shaft 14 of the apparatus 10, and the actuating body 16 is identical to the slider sleeve. As a consequence, the slotted guide sections 18 are formed directly on the radial outer side of the shifting element which is configured as a slider sleeve, with the result that the number of individual components is advantageously reduced. However, a comparatively great amount of axial installation space is required in the region of the slider sleeve, in order to form the slotted guide sections 18 and to arrange the linear actuator 20 in an adjacent manner with respect thereto.

FIG. 4 shows a transparently illustrated actuating body 16 for an apparatus 10 for axially adjusting a shifting element 12, the actuating body 16 having precisely two slotted guide sections 18 which preferably extend over in each case somewhat less than 180°. Transferred to the above-described manual transmission, a shifting operation might be carried out, for example, between a neutral position N and (precisely) one of the shifting positions G1, G2 by way of an actuating body 16 according to FIG. 4 and an associated linear actuator 20.

The slotted guide sections 18 which are adjacent in the circumferential direction are spaced apart from one another according to FIG. 4, with the result that there are groove-free sections 46 in the circumferential direction between the slotted guide sections 18 which are configured as a groove. In other words, the radial groove depth of the slotted guide sections 18 is reduced to "zero" by way of ramps 32 in the engaging regions 26 and disengaging regions 28. The groove-free sections 46 make particularly simple engaging and disengaging of the actuator pin 22 possible.

In contrast, FIG. 5 shows a conventional actuating body 16' in accordance with the prior art. On its circumferential face, the actuating body 16' has merely a single slotted guide section 18' which is configured as a groove and the radial groove depth of which is reduced to "zero" in the engaging region 26' and disengaging region 28' by way of ramps 32'. Therefore, merely a single axial actuating movement can be realized by way of the actuating body 16', for example from a neutral position N into one of the shifting positions G1, G2 or, as an alternative, from one of the shifting positions G1, G2 into the neutral position N.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for axially adjusting a shifting element, comprising:
   a shift shaft which is rotatable about an axis;
   an actuating body which is connected to the shift shaft fixedly so as to rotate with the shift shaft and is connected in an axially displaceable manner, the actuating body having, on a circumferential face, at least two slotted guide sections which are configured as a groove; and a linear actuator which is assigned to the actuating body and has an actuable actuator pin which is engageable into the slotted guide sections for axially displacing the actuating body, wherein each slotted guide section has an engaging region for the actuator pin, an opposite disengaging region for the actuator pin, and an actuating region which lies in between in a circumferential direction and is bent in a curved manner for axially displacing the actuating body, and the engaging region and the disengaging region of slotted guide sections which are adjacent in the circumferential direction are arranged at the same axial position.

2. The apparatus as claimed in claim 1, wherein the slotted guide sections which are adjacent in the circumferential direction merge into one another and form a slotted guide which runs continuously in the circumferential direction.

3. The apparatus as claimed in claim 1, wherein the slotted guide sections which are adjacent in the circumferential direction are spaced apart from one another.

4. The apparatus as claimed in claim 1, wherein the engaging regions and/or the disengaging regions are configured at least in sections as ramps for reducing a radial groove depth.

5. The apparatus as claimed in claim 1, wherein the engaging region and the opposite disengaging region of a slotted guide section are spaced apart axially from one another.

6. The apparatus as claimed in claim 1, wherein the actuating body has precisely two slotted guide sections.

7. The apparatus as claimed in claim 2, wherein the actuating body has precisely two slotted guide sections.

8. The apparatus as claimed in claim 3, wherein the actuating body has precisely two slotted guide sections.

9. The apparatus as claimed in claim 1, wherein the actuating body has precisely four slotted guide sections.

10. The apparatus as claimed in claim 1, wherein the actuating body has an even number of slotted guide sections.

11. The apparatus as claimed in claim 1, further comprising:

a rotational angle sensor that determines a rotational position of the actuating body.

12. The apparatus as claimed in claim 1, wherein the shift shaft is a camshaft and the shifting element is a cam carrier.

13. The apparatus as claimed in claim 1, wherein the shifting element is a slider sleeve of a manual transmission for a vehicle.

14. A manual transmission for a vehicle, comprising:

a drive shaft; and an apparatus for axially adjusting a shifting element as claimed in claim 11, wherein the drive shaft is connected in gear terms to the shift shaft or is identical to the shift shaft.

15. The manual transmission as claimed in claim 14, wherein the drive shaft and the shift shaft are coupled by way of a transmission gear mechanism with a fixed transmission ratio.

16. The manual transmission as claimed in claim 15, wherein the actuating body and the shifting element are coupled in the axial direction via a spring element.

17. The manual transmission as claimed in claim 14, wherein the actuating body and the shifting element are coupled in the axial direction via a spring element.

18. The manual transmission as claimed in claim 14, wherein the drive shaft corresponds to the shift shaft, and the actuating body and the shifting element are integrated.

* * * * *